(12) United States Patent
Neves et al.

(10) Patent No.: US 10,831,938 B1
(45) Date of Patent: Nov. 10, 2020

(54) PARALLEL POWER DOWN PROCESSING OF INTEGRATED CIRCUIT DESIGN

(71) Applicant: International Business Machines Corporation, Armonk, NY (US)

(72) Inventors: Jose Neves, Poughkeepsie, NY (US); Adam Matheny, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/540,094

(22) Filed: Aug. 14, 2019

(51) Int. Cl.
| | |
|---|---|
| *G06F 30/00* | (2020.01) |
| *G06F 30/394* | (2020.01) |
| *G06F 119/06* | (2020.01) |
| *G06F 30/3312* | (2020.01) |
| *G06F 30/398* | (2020.01) |
| *G06F 119/12* | (2020.01) |

(52) U.S. Cl.
CPC .......... *G06F 30/00* (2020.01); *G06F 30/394* (2020.01); *G06F 30/3312* (2020.01); *G06F 30/398* (2020.01); *G06F 2119/06* (2020.01); *G06F 2119/12* (2020.01)

(58) Field of Classification Search
CPC ............ G06F 2119/06; G06F 2119/12; G06F 30/3312; G06F 30/394; G06F 30/398; G06F 30/00
See application file for complete search history.

(56) References Cited

U.S. PATENT DOCUMENTS

| | | | | |
|---|---|---|---|---|
| 4,701,743 | A * | 10/1987 | Pearlman | B60Q 1/2611 318/256 |
| 4,764,868 | A * | 8/1988 | Ketelhut | G05B 19/054 710/12 |
| 5,452,239 | A | 9/1995 | Dai et al. | |
| 5,515,390 | A * | 5/1996 | Benton | G06F 11/0754 324/73.1 |
| 5,844,913 | A * | 12/1998 | Hassoun | G01R 31/31924 714/718 |
| 6,345,379 | B1 * | 2/2002 | Khouja | G06F 30/33 716/115 |
| 6,662,352 | B2 * | 12/2003 | Nsame | G06F 30/367 716/113 |
| 6,801,050 | B2 * | 10/2004 | Takechi | G01R 31/31924 324/754.07 |
| 6,930,506 | B2 * | 8/2005 | Cranford, Jr. | H03K 19/0005 326/26 |

(Continued)

OTHER PUBLICATIONS

Transmittal Form PTO/SB/21 signed Mar. 16, 2020.

*Primary Examiner* — Helen Rossoshek
(74) *Attorney, Agent, or Firm* — Cantor Colburn LLP; William Kinnaman

(57) ABSTRACT

Techniques for parallel power down processing of an integrated circuit (IC) design are described herein. An aspect includes receiving IC design information comprising a plurality of IC elements. Another aspect includes identifying a plurality of timing endpoints in the IC design information. Another aspect includes determining a plurality of nets, each net comprising a respective subset of the plurality of IC elements, based on the identified plurality of timing endpoints. Another aspect includes performing power down processing of net drivers in the plurality of nets, wherein the power down processing of at least a subset of the plurality of nets is performed in parallel.

17 Claims, 5 Drawing Sheets

(56) References Cited

U.S. PATENT DOCUMENTS

| | | | | |
|---|---|---|---|---|
| 6,996,512 B2* | 2/2006 | Alpert | G06F 30/392 | 703/14 |
| 7,222,311 B2* | 5/2007 | Kaufman | G06F 30/39 | 716/113 |
| 7,853,912 B2* | 12/2010 | Binder | G06F 30/3312 | 716/113 |
| 7,962,876 B2* | 6/2011 | Oh | G06F 30/33 | 716/113 |
| 7,984,405 B2* | 7/2011 | Mang | G06F 30/3312 | 716/110 |
| 8,091,058 B2* | 1/2012 | Ballard | G06F 30/394 | 716/114 |
| 8,146,047 B2* | 3/2012 | Gregory | G06F 30/3312 | 716/136 |
| 8,595,671 B2* | 11/2013 | He | G06F 30/34 | 716/116 |
| 8,776,003 B2* | 7/2014 | Zahn | G06F 30/3312 | 716/133 |
| 8,782,578 B2* | 7/2014 | Tell | G06F 1/10 | 716/101 |
| 8,990,750 B2* | 3/2015 | Iyer | G06F 30/327 | 716/113 |
| 9,058,440 B1* | 6/2015 | Kolpekwar | G06F 30/20 | |
| 9,058,451 B2* | 6/2015 | Lin | G06F 30/327 | |
| 10,031,986 B1* | 7/2018 | Kumar | G06F 30/367 | |
| 10,333,535 B1* | 6/2019 | Mendel | H03L 7/093 | |
| 2004/0243958 A1 | 12/2004 | Bednar et al. | | |
| 2005/0081175 A1* | 4/2005 | Scott | G06F 30/327 | 716/113 |
| 2015/0237693 A1* | 8/2015 | Knoedgen | H05B 45/50 | 315/224 |
| 2017/0371998 A1* | 12/2017 | Krauch | G06F 30/398 | |
| 2019/0064872 A1 | 2/2019 | Bourgeault | | |
| 2019/0101952 A1* | 4/2019 | Diamond | G06F 15/825 | |

\* cited by examiner

US 10,831,938 B1

PARALLEL POWER DOWN PROCESSING OF INTEGRATED CIRCUIT DESIGN

BACKGROUND

The present invention generally relates to integrated circuits (ICs), and more specifically, to parallel power down processing of an IC design.

A goal of IC chip design may be to reduce power requirements of the chip without impacting the functions performed by the chip. Reducing the power consumption reduces the temperature of the chip during operation, and may reduce the resources that are required to cool the chip during operation. In an IC design, designers link functional blocks together to form the chip. The functional blocks may include a relatively large number (e.g., millions) of buffers. The power requirements of the IC may be reduced if the number and/or size of any of the buffers may be reduced.

SUMMARY

Embodiments of the present invention are directed to parallel power down processing of an integrated circuit (IC) design. A non-limiting example computer-implemented method includes receiving IC design information comprising a plurality of IC elements. The method also includes identifying a plurality of timing endpoints in the IC design information. The method also includes determining a plurality of nets, each net comprising a respective subset of the plurality of IC elements, based on the identified plurality of timing endpoints. The method also includes performing power down processing of net drivers in the plurality of nets, wherein the power down processing of at least a subset of the plurality of nets is performed in parallel.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
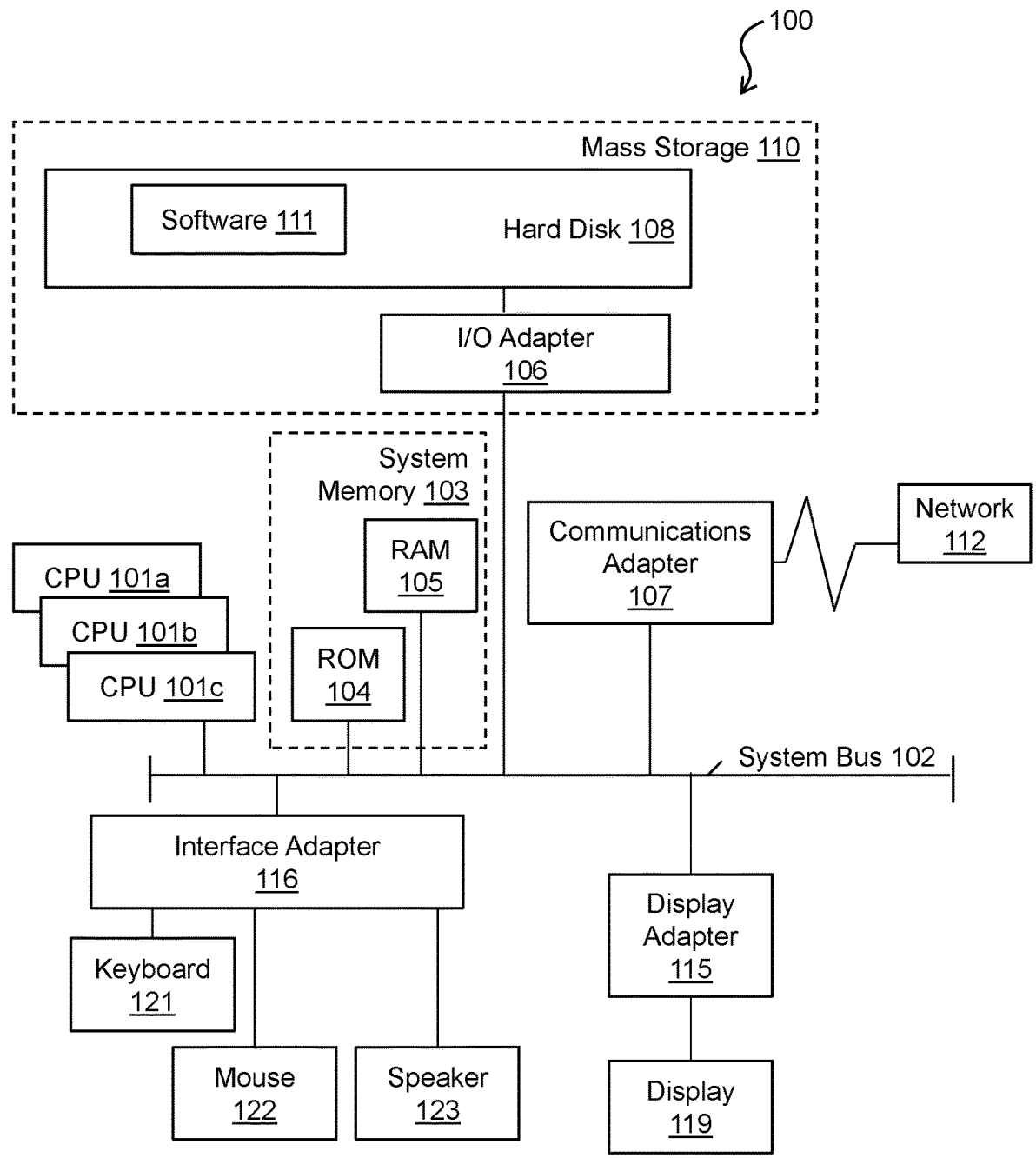
FIG. 1 is a block diagram of an example computer system for use in conjunction with parallel power down processing of an integrated circuit (IC) design.

One or more embodiments of the present invention provide parallel power down processing of an integrated circuit (IC) design. Parallel power down processing (e.g., reducing the amount of current required by the IC during operation) may be performed in a hierarchical IC design with timing visibility across hierarchical levels. In embodiments of parallel power down processing of an IC design, the IC design may be divided into nets based on identified timing endpoints in the IC design. The gates driving these nets (i.e., net drivers) may then be processed for power down processing in parallel without affecting the timing of the chip. A right to left traversal approach that starts at the sinks of the IC design and proceeds through the various logic elements to the source may be used to identify the timing endpoints.

In some embodiments, parallel power down processing of an IC design may include determining nets based on the power domain in a hierarchical IC design, identifying any nets with slack greater than a given value, and tracing the identified nets from right to left in a path starting from the sinks of the hierarchal design and ending at the power source. Within each net, IC elements (i.e., net drivers) are powered down along the path based on the available slack in the net while keeping timing within limits (i.e., keeping the slack positive) and keeping the slew steady. The right to left optimization may be extended across all levels of logic of the IC design traceable from the timing graph. A right most level (e.g., a sink) is determined before tracing backward to the source. Edges associated with gates are determined and nets are organized in levels and ordered right to left.

Embodiments of parallel power down processing of an IC design may reduce the size and/or power of buffer trees, and may also trace through any appropriate type of logic structure to free up resources, including but not limited to reducing threshold voltage, power levels, and wires. Starting at the sinks may decrease the size of the buffers and any other logic gate with multiple power levels that are processed by the power down processing. The power down processing may also make transistors smaller without causing timing problems in the IC, and while keeping the slew rate within timing constraints in the resulting powered down IC design. Any IC element may be processed for power down processing, such as buffers, inverters, multiplexers, or any logic gate that has a power level associated with the gate. The net drivers that are powered down may be gates that have multiple powers levels, allowing evaluation of the different levels and selection of a smallest level that preserves timing (i.e., keeps the net slack positive, or greater than a threshold, and keeps the slew limits of the signal at all the sinks of the net within pre-defined design limits, which may be defined as a function of the clock cycle associated with the net).

After the timing endpoints and corresponding nets have been identified in the IC design, a forked approach may be used to deploy parallel jobs to perform the power down processing. A number of available threads may be identified, and a number of nets or gates may be balanced among the available threads to deploy parallel jobs. A main process may sleep until a completion signal is received, indicating that all of the threads have completed their assigned forked job. The completion signal may be generated by a last forked job in some embodiments.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
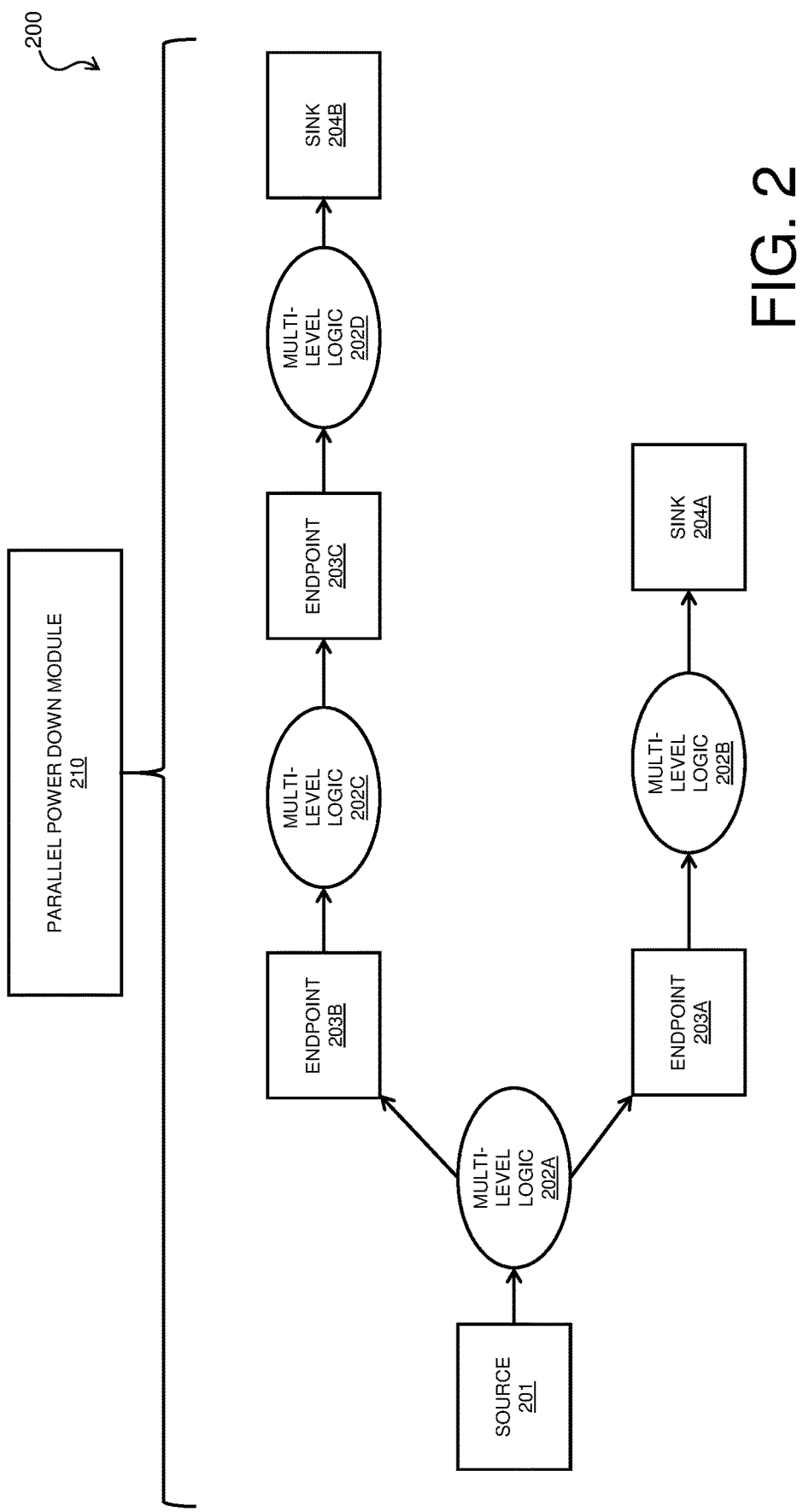
FIG. 2 is a block diagram of components of an IC design for parallel power down processing in accordance with one or more embodiments of the present invention.

Turning now to FIG. 2, system 200 that includes an IC design for parallel power down processing is generally shown in accordance with one or more embodiments of the present invention. System 200 includes IC design information including a plurality of IC elements, for example, sources, sinks, latches, logic gates, buffers, multiplexers, and inverters. The IC elements are connected by wires. Parallel power down module 210 receives the IC design information and identifies endpoints, such as endpoints 203A-C, in the IC design information. Endpoints 203A-C are timing endpoints in the IC design, and may be any element that is controlled by a system clock, including but not limited to latches that store a value based on the system clock, in some embodiments. The endpoints 203A-C are connected between source 201 and sinks 204A-B via multi-level logic 202A-D. Multi-level logic 202A-D may each include any appropriate number and type of logic elements (including net drivers) that may be included in an IC, including but not limited to resistors, capacitors, inductors, logic gates (e.g., AND, OR, NAND, NOR), buffers, multiplexers, and inverters. The logic elements within any of multi-level logic 202A-D may be interconnected by wires in any appropriate fashion. Power is received by the IC design at source 201, and propagates through multi-level logic 202A-D and endpoints 203A-C to sinks 204A-B.

Parallel power down module 210 may be part of software 111 of FIG. 1 in some embodiments. The parallel power down module 210 may identify nets (e.g., each of multi-level logic 202A-D) that are appropriate for parallel power down processing based on the identified endpoints 203A-D. Because each multi-level logic 202A-D is separated by a timing endpoint 203A-D, the IC elements within each multi-level logic 202A-E may be powered down separately without disturbing the overall timing the in IC.

As shown in FIG. 2, a signal (e.g., an electrical signal) from source 201 may propagate through multi-level logic 202A, and a value of the signal may be captured at each of endpoints 203A and 203B. The captured value from endpoint 203A may propagate through multi-level logic 202B to sink 204A. The captured value from endpoint 203B may propagate through multi-level logic 202C, and a value of the signal may be captured in endpoint 203C. The captured value from endpoint 203C may propagate through multi-level logic 202D to sink 204B. FIG. 2 is shown for illustrative purposes only; IC design information may include any appropriate number of IC elements, including timing endpoints, that are connected in any appropriate manner. In some embodiments, IC design information may include a number of elements having a number in the order of millions that may be processed by parallel power down module 210.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., IC elements, additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
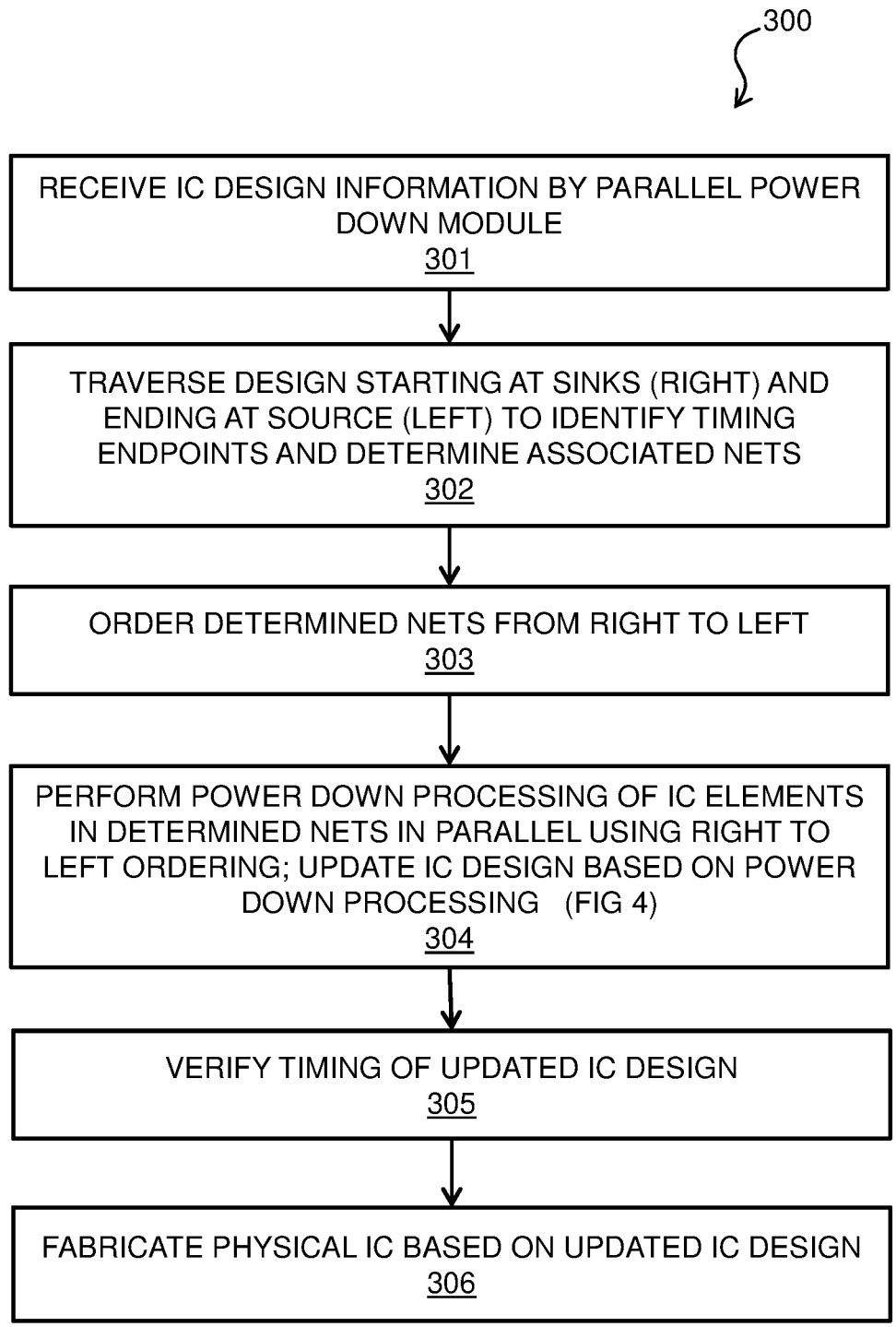
FIG. 3 is a flow diagram of a process for parallel power down processing of an IC design in accordance with one or more embodiments of the present invention.

FIG. 3 shows a process flow diagram of a method 300 for parallel power down processing of an IC design in accordance with one or more embodiments of the present invention. Method 300 is discussed with respect to system 200 of FIG. 2, and may be implemented in parallel power down module 210. In block 301, the parallel power down module 210 receives IC design information, including at least one source, a plurality of sinks, and a plurality of interconnected logic elements (e.g., net drivers), including but not limited to latches, logic gates (e.g., AND, OR, NAND, NOR), buffers, multiplexers, and inverters connected between the source and the plurality of sinks. In various embodiments, the IC design information that is received in block 301 may include all of the elements in an IC design, or a subset of the elements of an IC design. If a subset of IC elements is provided to the parallel power down processing module 210 in block 301, power down processing may be performed for the subset of the IC elements.

In block 302, the parallel power down module 210 traverses the IC design information to identify timing endpoints in the IC design information, such as endpoints 203A-C. The traversal of block 302 may start at sinks, such as sinks 204A-B, and end at a source, such as source 201. The traversal of block 302 may be referred to as a right-to-left traversal. The endpoints 203A-C may be any element that is controlled by a system clock, including but not limited to latches, in some embodiments. Based on identifying the endpoints 203A-C, the remaining logic elements in the IC design information are grouped into nets in block 302. For example, as shown in FIG. 2, multi-level logic 202A may be a first net, multi-level logic 202B may be a second net, multi-level logic 202C may be a third net, and multi-level logic 202D may be a fourth net; the nets are separated by timing endpoints 203A-C. IC design information such as is processed by method 300 may include any appropriate number of timing endpoints, and any appropriate number of associated nets, that are connected in any appropriate manner between the source and a plurality of sinks. Further, each net may include any appropriate number and type of logic devices (e.g., net drivers).

In block 303, the nets that were determined in block 302 are ordered from right (e.g., at the sinks) to left (e.g., at the source). In the example of system 200 of FIG. 2, multi-level logic 202D is a first-level net, multi-level logic 202B and multi-level logic 202C are second-level nets, and multi-level logic 202A is a third-level net. Power down processing for nets that are on the same level may be performed in parallel. In block 304, the determined nets are processed by parallel power down module 210 to determine an updated version of the IC design that may consume less power during operation than the original IC design that was received in block 301. Within each net, IC elements (e.g., the logic gates driving the nets, or net drivers) are powered down along the path based on the available slack in the net. An incremental timing engine may be used to determine if a buffer of the IC design can be powered down. For example, if the timing is positive and the slew rates are within limits at a buffer, the buffer may be powered down (e.g., reduced in size). The parallel power down processing of block 304 may reduce the size and/or power of buffer trees, and may also trace through any appropriate type of logic structure to free up resources, including but not limited to reducing threshold voltage, power levels, and wires. The power down processing may also make transistors in a net smaller based on the available slack in the net. Any IC element may be modified by the power down processing of block 304, such as buffers, inverters, multiplexers, or any logic gate that has a power level associated with the gate. Block 304 is discussed in further detail with respect to FIG. 4.

In block 305, because reducing the power of IC elements may increase delay in the IC after the parallel power down processing of the determined nets is complete, timing verification of the updated IC design may be performed to verify that the timing of the powered down IC is valid, e.g., the slack is positive and there are no new slew violations (e.g., an amount of time it takes to change a signal from 0 to 1 or vice versa) in the updated IC design. The timing analysis of block 305 may be performed at all levels of the IC hierarchy. Based on the timing of the updated IC design being verified in block 305, in block 306, the verified IC design may be used to fabricate a physical IC chip. The resulting IC chip may use lower power than a chip based on the original IC design information that was received in block 301. Fabrication of the verified IC design as is performed in block 306 is discussed in further detail with respect to FIG. 5 below.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
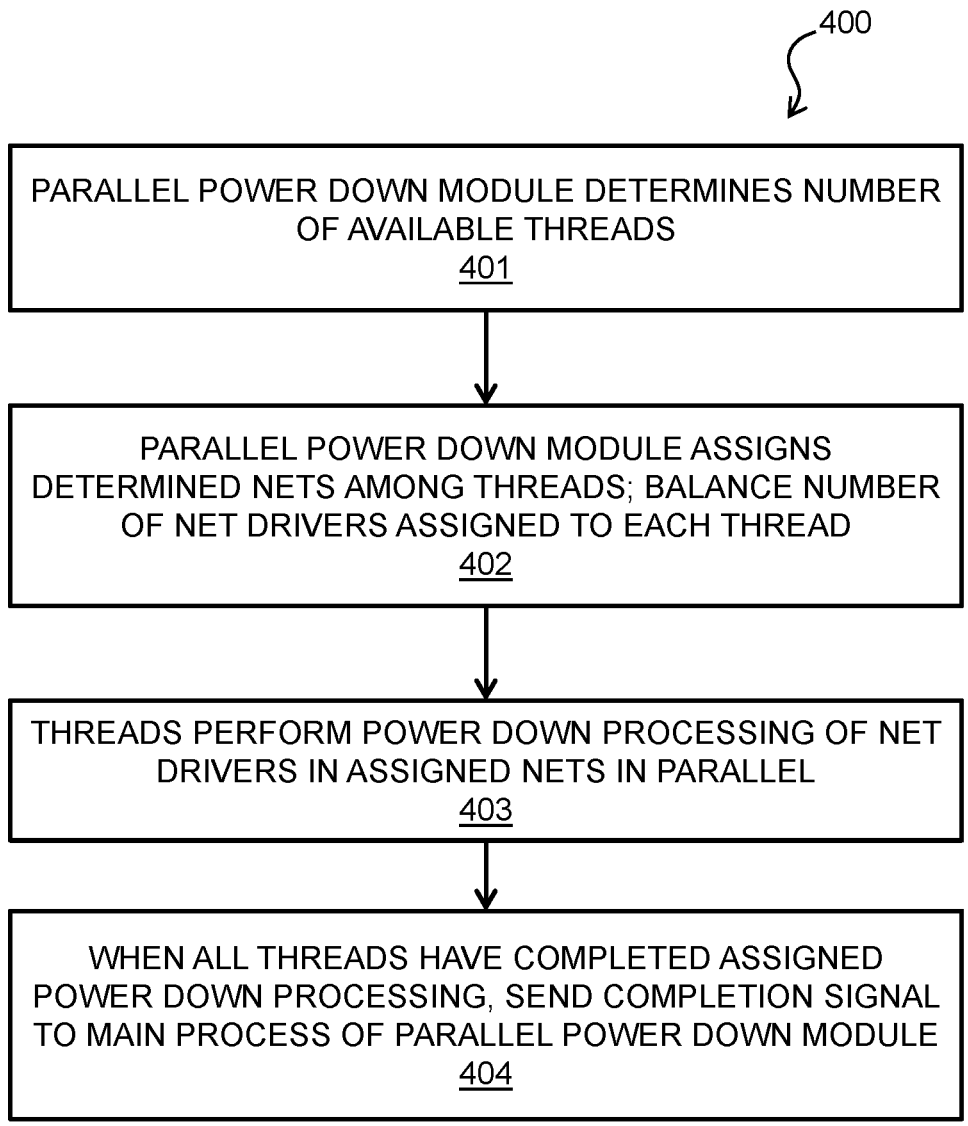
FIG. 4 is a flow diagram of another process for parallel power down processing of an IC design in accordance with one or more embodiments of the present invention.

FIG. 4 shows a process flow diagram of another method 400 for parallel power down processing of an IC design in accordance with one or more embodiments of the present invention. Method 400 is discussed with respect to system 200 of FIG. 2, and may be implemented in parallel power down module 210 in block 304 of method 300 of FIG. 3. In block 401, the parallel power down module 210 determines a number of available threads to perform the power down processing. In block 402, the ordered nets that were determined in block 303 of FIG. 3 are assigned among the available threads as a plurality of forked jobs. The assignments may be made in such a manner as to balance a total number of logic gates (i.e., net drivers) assigned to each thread. In block 403, the threads each perform power down processing of their assigned nets in parallel. The parallel power down processing of block 403 may modify any IC elements in a net as discussed above with respect to block 304 of FIG. 3. The net drivers that are powered down in block 403 may be gates that have multiple powers levels, allowing evaluation of the different levels and selection of a smallest level for the powered down gate that preserves timing (i.e., keeps the net slack positive, or greater than a threshold, and keeps the slew limits of the signal at all the sinks of the net within pre-defined design limits, which may be defined as a function of the clock cycle associated with the net). In block 404, when all of the threads have completed the power down processing of each thread's respective assigned net(s), a completion signal is sent to the parallel power down module 210. A main process of the parallel power down module 210 may sleep until the completion signal, indicating that all of the threads have completed their assigned forked job, is received. The completion signal may be generated by a thread corresponding to a last forked job in some embodiments.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
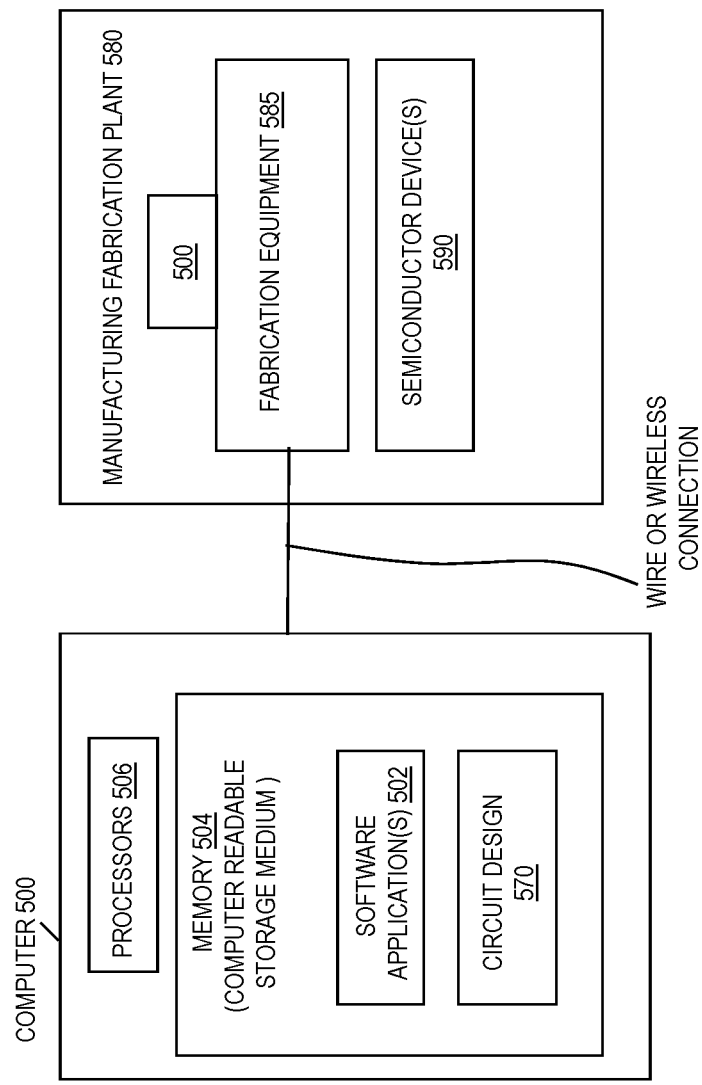
FIG. 5 depicts a system of a computer system integrated with a manufacturing fabrication plant according to embodiments of the invention.

In some embodiments, a verified IC design (or semiconductor layout) that is generated according to method 300 of FIG. 3 and method 400 of FIG. 4 can be generated using the computer system 500 shown in FIG. 5. The computer system 500 has one or more software applications 502 configured to function and implement operations as discussed herein. For example, software applications 502 may include one or more parallel power down routines for performing power down processing of an IC design. A semiconductor layout can be constructed, including application of parallel power down processing as described with respect to method 300 of FIG. 3 and method 400 of FIG. 4, by the software application 502 of the computer 500 to build the semiconductor device (e.g., an integrated circuit). The computer 500 is configured to configured to guarantee design rule cleanliness (i.e., pass) for the semiconductor device before and/or without requiring a design rule check. The software applications 502 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 500 is coupled to, integrated with, and/or part of the fabrication equipment 585 at the manufacturing fabrication plant 580 (so as to communicate with and/or control operations of the fabrication equipment 585) to thereby fabricate semiconductor device(s) 590 as depicted in FIG. 5, as understood by one skilled in the art. The computer 500 includes one or processors 506 configured to execute one or more software applications 502 in memory 504. The computer 500 receives input of a design 570 for the semiconductor device 590, and the computer 500 is configured to develop/form the semiconductor layout for the semiconductor device in order to build the semiconductor device. The semiconductor layout is a physical design released to the manufacturing fabrication (Fab) plant 580 and physically fabricated by the fabrication equipment 585 to produce the semiconductor device 590. The manufacturing fabrication plant 580 builds the photo mask from the semiconductor layout as a physical design, and then builds the actual product using the photo mask. The product is an integrated circuit (i.e., semiconductor device 590) on a wafer according to the semiconductor layout (physical design). There may be numerous integrated circuits on a wafer, and each integrated circuit may be diced into an individual chip.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, integrated circuit (IC) design information comprising a plurality of IC elements;
identifying a plurality of timing endpoints in the IC design information;
determining a plurality of nets, each net comprising a respective subset of the plurality of IC elements, based on the identified plurality of timing endpoints; and
performing power down processing of the plurality of IC elements in the plurality of nets, wherein the power down processing of at least a subset of the plurality of nets is performed in parallel, and wherein performing the power down processing of the plurality of IC elements in the plurality of nets comprises:
determining a number of available threads;
assigning the plurality of nets among the available threads, wherein the assigning is performed such that a number of gates assigned to each thread of the available threads is balanced; and
performing, by each of the available threads, power down processing of the plurality of nets assigned to each thread of the available threads.

2. The method of claim 1, wherein identifying the plurality of timing endpoints in the IC design information comprises:
identifying a sink in the IC design information;
tracing from the sink back to a source of the IC design information.

3. The method of claim 1, wherein a timing endpoint of the plurality of timing endpoints comprises a latch.

4. The method of claim 1, wherein determining a net of the plurality of nets comprises:
determining a set of IC elements located directly between two timing endpoints of the plurality of timing endpoints, wherein the set of IC elements comprises the net.

5. The method of claim 1, further comprising:
ordering the plurality of nets from a sink to a source of the IC design information before performing the power down processing in order to assign a level to each of the plurality of nets, wherein the power down processing of the plurality of nets assigned to a same level is performed in parallel.

6. The method of claim 1, wherein the power down processing comprises at least one of reducing a size of a buffer in the IC design information, reducing a threshold voltage of a transistor in the IC design information, selecting of a smaller level for a multiple power level gate, and reducing a size of a transistor of the IC design information; and
wherein the power down processing is performed based on an amount of slack in a net that is being processed.

7. A system comprising:
a memory having computer readable instructions; and
one or more processors for executing the computer readable instructions, the computer readable instructions controlling the one or more processors to perform operations comprising:

receiving integrated circuit (IC) design information comprising a plurality of IC elements;

identifying a plurality of timing endpoints in the IC design information;

determining a plurality of nets, each net comprising a respective subset of the plurality of IC elements, based on the identified plurality of timing endpoints; and performing power down processing of the plurality of IC elements in the plurality of nets, wherein the power down processing of at least a subset of the plurality of nets is performed in parallel, and wherein performing the power down processing of the plurality of IC elements in the plurality of nets comprises:

determining a number of available threads;

assigning the plurality of nets among the available threads, wherein the assigning is performed such that a number of gates assigned to each thread of the available threads is balanced; and performing, by each of the available threads, power down processing of the plurality of nets assigned to each thread of the available threads.

8. The system of claim 7, wherein identifying the plurality of timing endpoints in the IC design information comprises:

identifying a sink in the IC design information;

tracing from the sink back to a source of the IC design information.

9. The system of claim 7, wherein a timing endpoint of the plurality of timing endpoints comprises a latch.

10. The system of claim 7, wherein determining a net of the plurality of nets comprises:

determining a set of IC elements located directly between two timing endpoints of the plurality of timing endpoints, wherein the set of IC elements comprises the net.

11. The system of claim 7, the operations further comprising:

ordering the plurality of nets from a sink to a source of the IC design information before performing the power down processing in order to assign a level to each of the plurality of nets, wherein the power down processing of the plurality of nets assigned to a same level is performed in parallel.

12. The system of claim 7, wherein the power down processing comprises at least one of reducing a size of a buffer in the IC design information, reducing a threshold voltage of a transistor in the IC design information, selecting of a smaller level for a multiple power level gate, and reducing a size of a transistor of the IC design information; and wherein the power down processing is performed based on an amount of slack in a net that is being processed.

13. A computer program product comprising a computer readable storage medium having program instructions embodied therewith, the program instructions executable by a processor to cause the processor to perform operations comprising:

receiving integrated circuit (IC) design information comprising a plurality of IC elements;

identifying a plurality of timing endpoints in the IC design information;

determining a plurality of nets, each net comprising a respective subset of the plurality of IC elements, based on the identified plurality of timing endpoints; and performing power down processing of the plurality of IC elements in the plurality of nets, wherein the power down processing of at least a subset of the plurality of nets is performed in parallel, and wherein performing the power down processing of the plurality of IC elements in the plurality of nets comprises:

determining a number of available threads;

assigning the plurality of nets among the available threads, wherein the assigning is performed such that a number of gates assigned to each thread of the available threads is balanced; and performing, by each of the available threads, power down processing of the plurality of nets assigned to each thread of the available threads.

14. The computer program product of claim 13, wherein identifying the plurality of timing endpoints in the IC design information comprises:

identifying a sink in the IC design information;

tracing from the sink back to a source of the IC design information.

15. The computer program product of claim 13, wherein a timing endpoint of the plurality of timing endpoints comprises a latch.

16. The computer program product of claim 13, wherein determining a net of the plurality of nets comprises:

determining a set of IC elements located directly between two timing endpoints of the plurality of timing endpoints, wherein the set of IC elements comprises the net.

17. The computer program product of claim 13, the operations further comprising:

ordering the plurality of nets from a sink to a source of the IC design information before performing the power down processing in order to assign a level to each of the plurality of nets, wherein the power down processing of the plurality of nets assigned to a same level is performed in parallel.

* * * * *